United States Patent
Karlsson et al.

(10) Patent No.: US 8,295,869 B2
(45) Date of Patent: Oct. 23, 2012

(54) METHOD AND APPARATUS FOR IMPROVING TRANSMISSION EFFICIENCY IN A MOBILE RADIO COMMUNICATIONS SYSTEM

(75) Inventors: Jonas B. Karlsson, Sollentuna (SE); David Astely, Bromma (SE); Bo Göransson, Sollentuna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 482 days.

(21) Appl. No.: 12/521,942

(22) PCT Filed: Feb. 5, 2007

(86) PCT No.: PCT/SE2007/050070
§ 371 (c)(1),
(2), (4) Date: Dec. 15, 2009

(87) PCT Pub. No.: WO2008/082345
PCT Pub. Date: Jul. 10, 2008

(65) Prior Publication Data
US 2010/0120460 A1 May 13, 2010

(30) Foreign Application Priority Data

Jan. 4, 2007 (WO) ................. PCT/SE2007/050001

(51) Int. Cl.
*H04B 7/00* (2006.01)
*H04Q 7/20* (2006.01)
(52) U.S. Cl. .............. 455/517; 455/550.1; 455/561; 375/220

(58) Field of Classification Search .......... 455/501, 455/502, 507, 508, 513, 517, 550.1, 551, 455/552, 561, 562.1; 375/146, 147, 220
See application file for complete search history.

(56) References Cited

U.S. PATENT DOCUMENTS

| | | | |
|---|---|---|---|
| 6,480,522 B1 * | 11/2002 | Hoole et al. ............... | 375/130 |
| 6,615,024 B1 | 9/2003 | Boros et al. | |
| 6,788,948 B2 | 9/2004 | Lindskog et al. | |
| 6,980,614 B2 * | 12/2005 | Miller et al. ............... | 375/347 |
| 7,333,531 B2 * | 2/2008 | Alamouti et al. ........... | 375/147 |
| 7,715,499 B2 * | 5/2010 | Warner ...................... | 375/326 |
| 8,014,366 B2 * | 9/2011 | Wax et al. .................. | 370/338 |
| 8,170,617 B2 * | 5/2012 | Nassiri-Toussi et al. .. | 455/562.1 |
| 2003/0048800 A1 | 3/2003 | Kilfoyle et al. | |

FOREIGN PATENT DOCUMENTS

| | | |
|---|---|---|
| JP | 2002368664 A | 12/2002 |
| JP | 2005505161 A | 2/2005 |
| JP | 2008053933 A | 3/2008 |
| WO | 02/095982 A1 | 11/2002 |
| WO | 03/028248 A1 | 4/2003 |
| WO | 03/050559 A1 | 6/2003 |

* cited by examiner

*Primary Examiner* — Nhan Le
(74) *Attorney, Agent, or Firm* — Coats & Bennett, P.L.L.C.

(57) ABSTRACT

A method and apparatus of improving the performance of a mobile radio system (100) comprising at least one radio device (105, 120) having at least two transmission equipments (114) adapted to transmit radio signals within a frequency band is disclosed. The method comprises deriving (220) a relative time delay of the at least two transmission equipments based on at least two sub-band transmit weight vectors, wherein a sub-band transmit weight vector comprises weight vectors applicable to the at least two transmission equipments, respectively, in a sub-band of the frequency band.

20 Claims, 6 Drawing Sheets

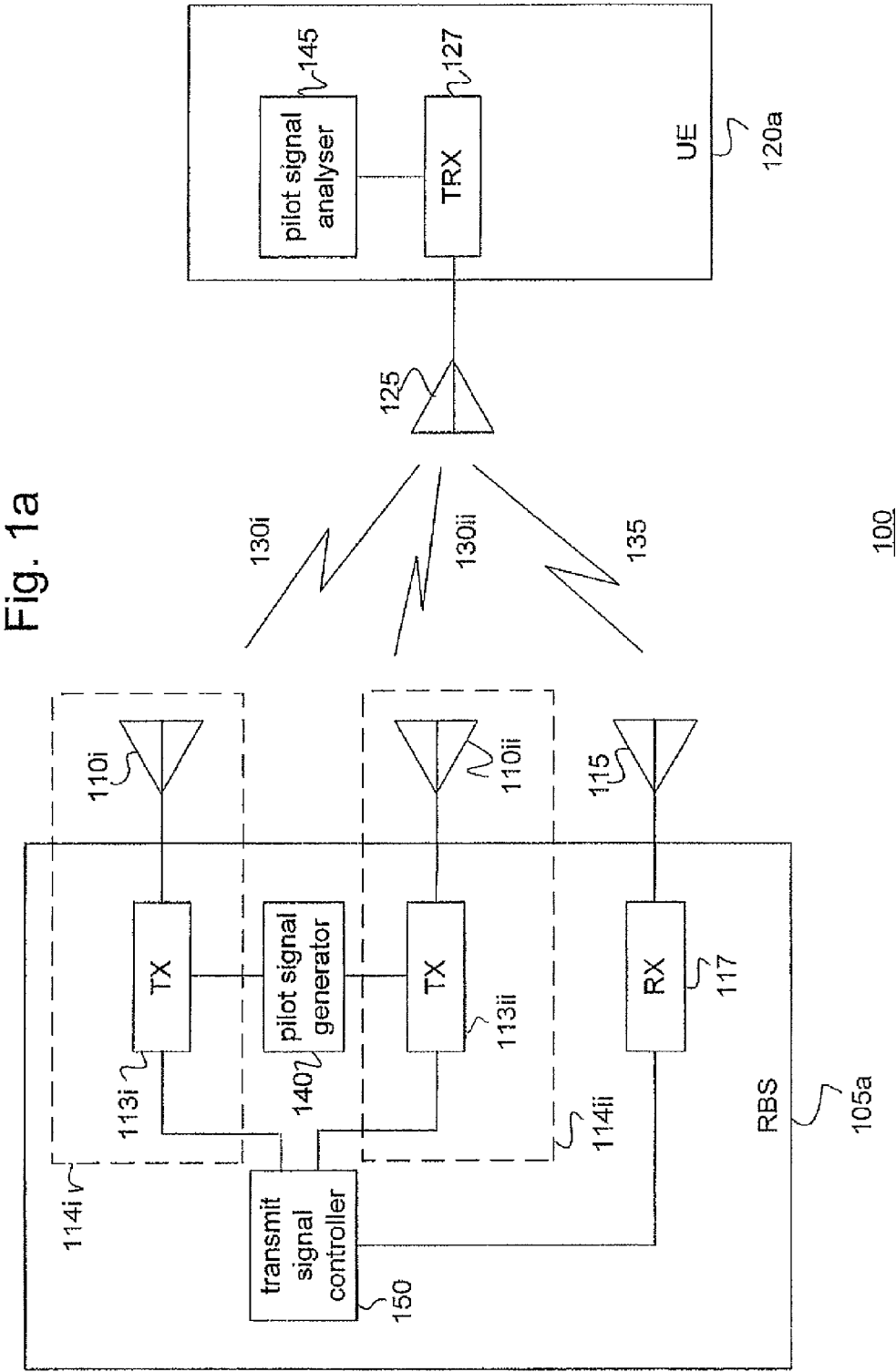

METHOD AND APPARATUS FOR IMPROVING TRANSMISSION EFFICIENCY IN A MOBILE RADIO COMMUNICATIONS SYSTEM

FIELD OF THE INVENTION

The present invention relates to the field of mobile radio communication in general, and in particular to radio devices having more than one transmission antenna.

BACKGROUND

In many mobile radio communications systems, transmit diversity is employed in order to create favourable conditions for the transmission of a radio signal from a radio base station to a user equipment. By transmitting a signal from two or more different antennas, more than one transmission path from the radio base station to the user equipment can be created, and the risk of loosing data due to fading etc. can hence be reduced. Furthermore, a desired signal beam shape can be achieved by the use of more than one antenna, if the antennas are placed at a sufficiently small distance from each other for the antennas to be correlated.

In a system employing transmit diversity, the radio base station generally transmits a pre-determined pilot signal from each of the transmitting antennas, which pilot signals are known by the user equipments. By measuring the received pilot signals, and comparing the measured pilot signals to the known transmitted pilot signals, a user equipment can determine a so called transmit weight for each of the transmitting antennas. A transmit weight is typically a complex number, indicating a phase and amplitude difference between the transmitted signal and the received signal, or between two different signals received by the user equipment. These transmit weights are then fed back to the radio base station, which can use the transmit weights in order to compensate for the differences in transmission path for the signal when travelling from the different transmitting antennas.

In EP1453223, a transmit diversity system comprising a plurality of antennas is disclosed. The plurality of antennas is divided into a plurality of antenna groups. A common pilot signal is transmitted via a reference antenna included in each group.

SUMMARY

A problem to which the present invention relates is how to increase the efficiency of a mobile radio communications system.

This problem is addressed by a method, computer program product and apparatus of improving the performance of a mobile radio system comprising at least one radio device having at least two transmission equipments adapted to transmit radio signals within a frequency band. The inventive method comprises deriving a relative time delay of the at least two transmission equipments based on at least two sub-band transmit weight vectors, wherein a sub-band transmit weight vector comprises weight vectors applicable to the at least two transmission equipments, respectively, in a sub-band of the frequency band. The derived relative time delay can be used in compensation (225) of a time misalignment of the at least two transmission equipments.

By the invention is achieved that relative time delay(s) between different transmission equipments of a radio base station or a user equipment can be determined, the relative time delays indicating a time misalignment between the different transmission equipments. If desired, the determined relative time delays can be used in order to compensate for this time misalignment, so that the time alignment of the transmission equipments of a radio device can be improved. By improving the time alignment, the bit error rate can be reduced, and hence, the effective bit rate of a transmission session can be improved.

In one aspect of the inventive method, the method further comprises receiving a signal indicative of the at least two sub-band transmit weight vectors; and generating an output signal indicative of the derived relative time delay(s); wherein the signal indicative of the at least two sub-band transmit weight vectors is used in the step of deriving. In this aspect, the signal indicative of the derived time delay(s) can be used in compensating for a time-misalignment between the different transmission equipments. The signal indicative of the at least two sub-band transmit weight vectors can preferably be obtained by measuring pilot signals transmitted by the at least two transmission equipments.

In one embodiment of the inventive method, the step of deriving comprises solving a set of equations expressing a relation between the sub-band weight vectors and a transmission path weight vector, wherein the transmission path weight vector comprises transmit weights indicative of transmit weights for compensation of time delay in a received signal caused by a transmission path. In another embodiment of the invention, the step of deriving comprises performing an element-wise operation of at least two of the sub-band transmit weight vectors. The element-wise operation can for example be element-wise phase difference.

In one embodiment of the invention, the step of deriving is performed a plurality of times so that a plurality of relative time delay values are generated for the at least two transmission equipments. An average is calculated of the plurality of relative time delay values in order to improve the accuracy of the derived relative time delay(s). The plurality of generated relative time delay values can be obtained from a plurality of measurements performed by a plurality of receiving radio devices, and/or from measurements performed at a plurality of moments in time. By averaging over a plurality of values, a better estimate of the relative time delay(s) can be obtained.

BRIEF DESCRIPTION OF THE DRAWINGS

For a more complete understanding of the present invention, and the advantages thereof, reference is now made to the following description taken in conjunction with the accompanying drawings, in which:

FIG. 1a schematically illustrates a mobile radio communications system comprising a radio base station having more than one transmitting antenna.

DETAILED DESCRIPTION

Figure 1B:
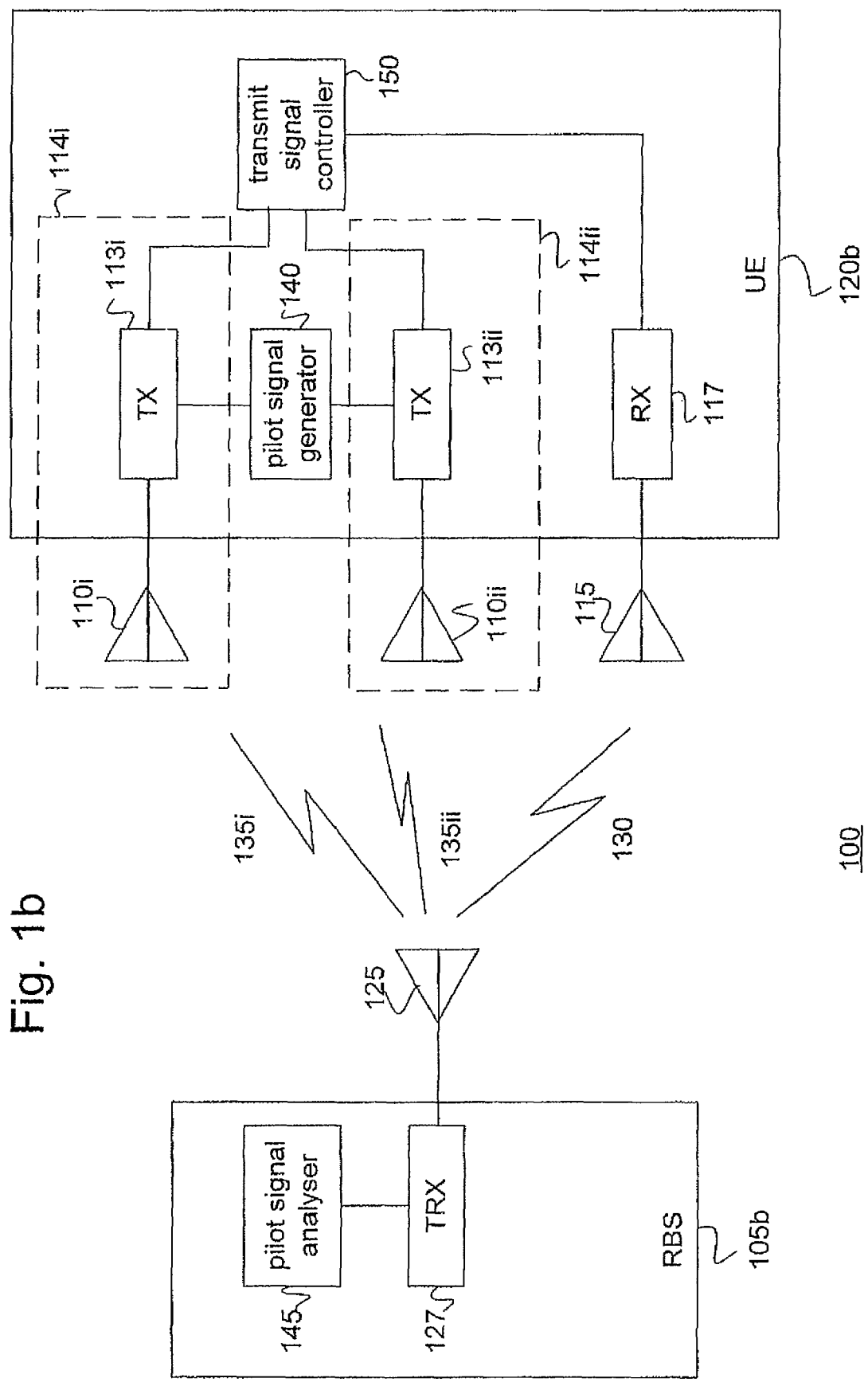
FIG. 1b schematically illustrates a mobile radio communications system comprising a user equipment having more than one transmitting antenna.

A mobile radio communications system 100 employing transmit diversity is schematically illustrated in FIG. 1a.

Mobile radio communications system 100 of FIG. 1a comprises a radio base station (RBS) 105a having a first and second transmitting antenna 110i and 110ii, connected to radio transmitters 113i and 113ii, respectively. The equipment of which at least two is supplied in order to create transmit diversity will in the following be referred to as transmission equipment 114. In FIG. 1a, transmission equipment 114i is shown to include the transmitting antenna 110i, the radio transmitter 113i to which the transmitting antenna 110 is connected, and cables connecting the transmitter 113i and the transmitting antenna 110i. Transmission equipment 114ii similarly includes transmitting antenna 110ii, transmitter 113ii and cables connecting the two. In other implementations of a radio base station 105a, the transmission equipment 114, of which at least two is supplied in order to create transmit diversity, may include other entities.

Radio base station 105a of FIG. 1a further comprises a receiving antenna 115 connected to a receiver 117. Mobile radio communications system 100 of FIG. 1 further comprises a user equipment (UE) 120a having an antenna 125, the user equipment being for example a mobile telephone or a computer. Antenna 125 of FIG. 1a is connected to a transceiver 127. Radio base station 105a and user equipment 120a can communicate radio signals between each other over radio links 130i, 130ii and 135, where radio links 130i and 130ii are downlinks, while radio link 135 is an uplink. In order to simplify the description, radio base station 105a of FIG. 1a is shown to have two transmitting antennas 110 and one receiving antenna 115, but could in an implementation have any number of transmitting antennas 110 and receiving antennas 115. Similarly, the user equipment could have more antennas 125 than the antenna 125 shown in FIG. 1a. The receiving antenna 115 of radio base station 105a is in FIG. 1a shown to be separate to the transmitting antennas 110, while the transmitting antennas 110 could, if desired, serve as receiving as well as transmitting antennas. The transmitters 113i and 113 and the receiver 117 could be combined in the same unit. In FIG. 1a, the transmit diversity is shown to be achieved by use of space diversity. However, other types of diversity could be employed, such as polarisation diversity. In the following, when different transmitting antennas 110 are referred to, this should be construed as different transmitting antenna elements, including the case when one transmitting antenna 110 comprises different antenna elements transmitting signals of different polarisation in order to create transmit diversity through polarisation diversity. Needless to say, a mobile radio communications system 100 normally comprises a plurality of radio base stations 105, a plurality of user equipments 120a, as well as many other nodes.

Closed-loop transmit diversity has been standardised in the 3GPP WCDMA (3rd Generation Partnership Project Wideband Code Division Multiple Access) standard. In the 3GPP LTE (Long Term Evolution) standard, closed-loop transmit diversity is presently being standardised, and is often referred to as pre-coding. The present invention is applicable to transmit diversity of any standard, including the pre-coding of the LTE standard.

Radio base station 105 of FIG. 1a comprises, inter alia, a pilot signal generator 140 adapted to generate pre-determined pilot signals which are fed to the transmitting antennas 110i and 110ii, respectively. Pilot signal generator 140 is connected to radio transmitters 113 (which are obviously also connected to a node, not shown, in mobile radio communications network 100, providing the radio base station 105 with a signal to be transmitted). Pilot signal generator 140 is normally adapted to generate different pre-determined pilot signals to be fed to different transmitting antennas 110, so that each transmitting antenna 110 transmits a pre-determined pilot signal that can be distinguished from all the pilot signals fed to the other transmitting antennas 110 of the radio base station 105. Alternatively, signal generator 140 can be adapted to transmit the same pilot signal pattern to different transmitting antennas 110 at different points in time and/or at different bearer frequencies, so that the transmission of the pilot signal from the different transmitting antennas 110 can be distinguished in the time and/or frequency domains.

User equipment 120a of FIG. 1a comprises, inter alia, a pilot signal analyser 145 connected to the transceiver 127. Pilot signal analyser 145 is adapted to measure the pilot signals transmitted by the different transmitting antennas 110 of the radio base station 105 to which the user equipment 120a is presently listening, and to determine a transmit weight for the different the transmission equipments 114 of the radio base station 105. A transmit weight is typically a complex number, indicating a phase and amplitude difference between the transmitted signal and the received signal, or between two different signals received by the user equipment 120a (if more than two transmitting antennas 110 are employed, one of the transmitting antennas 110 could advantageously be used as a reference transmitting antenna). The transmit weights could be transmitted from user equipment 120a to the radio base station 105. Radio base station 105 of FIG. 1a is shown to include a transmit signal controller 150 having an input connected to the receiver 117 and outputs connected to the respective transmitters 113. Transmit signal controller 150 is adapted to use the transmit weights in order to determine a phase and amplitude difference between the signals to be transmitted by the different transmitting antennas 110. When transmit diversity is employed in order to reduce the effects of fading, it is normally desirable to achieve a situation where the different signals transmitted by the different antennas 110 are perceived as one signal in the antenna 125 of the user equipment 120a, i.e. that the phase, and preferably also the amplitude, of the signals received on the different downlinks 130 are as similar as possible.

In mobile radio communications system 100 of FIG. 1a, only the radio base station 105 is shown to employ transmit diversity. However, in many implementations of a mobile radio communications system 100, it may similarly be advantageous for the user equipment 120 to employ transmit diversity. FIG. 1b illustrates a mobile radio communications system 100 wherein a user equipment 120b employs transmit diversity. User equipment 120b of FIG. 1b has two transmitting antennas 110i and 110ii and two transmitters 113i and 113ii, being part of transmission equipments 114i and 114ii, respectively, as well as a receiving antenna 115. The user equipment 120 of FIG. 1b comprises, inter alia, a pilot signal generator 140 adapted to generate pre-determined pilot signals which are fed to the transmitting antennas 110i and 110ii, respectively. Pilot signal generator 140 is connected to radio transmitters 113 (which is normally further connected to at least one other signal source (not shown), such as a microphone or an output from a microprocessor). Radio base station 105b of FIG. 1b has an antenna 125 connected to a transceiver 125, and a pilot signal analyser 145 connected to the transceiver 125.

In order to simplify the description, the radio base station 105b of FIG. 1b, as well as the user equipment 120a of FIG. 1a, are shown to not employ any transmit diversity, although in many implementations of the invention, both radio base stations 105 and user equipments 120 could have more than one transmission equipment 114.

In the following, a radio device employing transmit diversity, such as radio base station 105a of FIG. 1a and user equipment 120b of FIG. 1b, will be referred to as a transmitting radio device 105a/120b. A radio device that is used to receive a signal that has been transmitted by such a transmitting radio device 105a/120b is referred to as a receiving radio device 120a/105b. Needless to say, a transmitting radio device 105a/105b is not only adapted to transmit signals, but may also receive radio signals, and a receiving radio device is adapted not only to receive signals, but may also transmit radio signals. The terms "transmitting" and "receiving" are only used in order to clarify the description so that a distinction can be made between a radio device that is used for transmission in the described context and one that is used for radio reception. A radio base station 105 can at the same time be adapted to employ transmit diversity, and hence be a transmitting radio device 105a/120b according to the terminology used in the following, and be adapted to receive a signal transmitted by a transmitting radio device 120a/105b, and hence be a receiving radio device 120a/105b. A user equipment 120 may similarly be both a transmitting radio device 105a/120b and a receiving radio device 120a/105b.

In the general case, the transmission paths of the different radio links 130/135 vary with time and frequency as the transmission environment changes, for example as the user equipment 120 moves. Hence, the transmit weights determined based on a signal received by a receiving radio device 120a/105b will vary with time and frequency. The time and frequency scale of these variations may vary. In order to keep the transmitting radio device 105a/120b updated with variations in the transmit weight in an efficient manner, it is envisioned that the granularity of the feedback of the transmit weights from the receiving radio device 120a/105b to the transmitting radio device 105a/120b may be configurable in the time and frequency domain. In other words, at times when the transmission path changes fast, transmit weights can be determined at close time intervals, and if variations in transmit weights with frequency are expected, transmit weights can be determined for a plurality of sub-bands of the frequency band available for transmission. At other times, when the transmission environment is more constant, new values of the transmit weights can be derived less frequently, and if less variations in transmit weights with transmission frequency is expected, the transmit weight can be determined for fewer sub-bands.

In addition to the variation in transmission path, any time-misalignment of the different transmission equipments 114 will cause further variations in the frequency variation of the transmit weight. Such time-misalignment can for example be caused by a time inaccuracy of the radio transmitters 113 or other electronic equipment involved in the radio transmission, or by different length of cables connecting the different radio transmitters 113 with the different transmitting antennas 110. A particular time-misalignment of a transmission equipment 114 will cause different phase shifts at different frequencies of the transmission frequency band. A constant time delay causes a phase shift in the transmitted signal that varies with transmit frequency. Such frequency dependent phase shifts can cause severe problems: For example, if two antennas of high correlation are used to realise beam-forming and a single set of transmit weights is used for the entire frequency band, then a time delay corresponding to the inverse of the bandwidth of the transmitted signal will cause the main direction of the beam to rotate 360 degrees over the signal bandwidth—hence, the beam-forming effect is completely lost. For a 20 MHz bandwidth, the inverse of the bandwidth corresponds to 50 ns, and the delay of one transmitting antenna 110 in relation to the other transmitting antenna 110 needs to be sufficiently smaller than 50 ns, typically in the order of 5 ns. For a transmitting radio device 105a/120b where two or more transmitting antennas 110 are used to create transmit diversity, a time-misalignment between the transmitting antennas 110 will similarly cause variations with frequency in the spatial extension of the transmitted beam.

Hence, the time alignment requirements on the transmitting antennas 110 should be high in order for the mobile radio communication system 100 to work efficiently. The fulfilment of this requirement could e.g. be achieved by using radio transmitters 113 and other electronic equipment of high time accuracy. However, electronic equipment of high time accuracy is expensive, and ways of creating time alignment by use of less accurate equipment are therefore desired.

By performing feedback of transmit weights (or of data by means of which transmit weights can be deduced) at a high granularity in the time and frequency domain as discussed above, compensation can be made for any phase shift between signals received on different down links 130 (in case of the radio base station 105 employing transmit diversity) or different uplinks 135 (in case of the user equipment employing transmit diversity). However, the higher the granularity of the transmit weight feedback, the larger is the part of the valuable bandwidth that is used to transmit control data, and less bandwidth will be available for the transmission of user data.

According to the invention, relative time delays (time-misalignment) between different transmission equipments 114 can be estimated by performing an analysis of transmit weights of different sub-bands of the transmission band. By obtaining an estimate of the relative time delays of the different transmission equipments 114, the transmission equipments 114 can be calibrated accordingly, and the part of an undesired phase shift between signals received on different radio links 130/135 that is caused by the time-misalignment of the different transmission equipments 114 can be eliminated. This is particularly advantageous in situations where the transmitting antennas 110 are correlated, since the part of the phase shift between the received signals that originates from time misalignment is then comparatively large, but the invention is also advantageous for less correlated antennas.

For example, in a system where transmit weights can be fed back from the receiving radio device 120a/105b to the transmitting radio device 105a/120b at variable granularity in the time and frequency domain as discussed above, the rate at which transmit weights have to be fed back will be greatly reduced by application of the present invention, and hence, more bandwidth will be available for user data.

Figure 2:
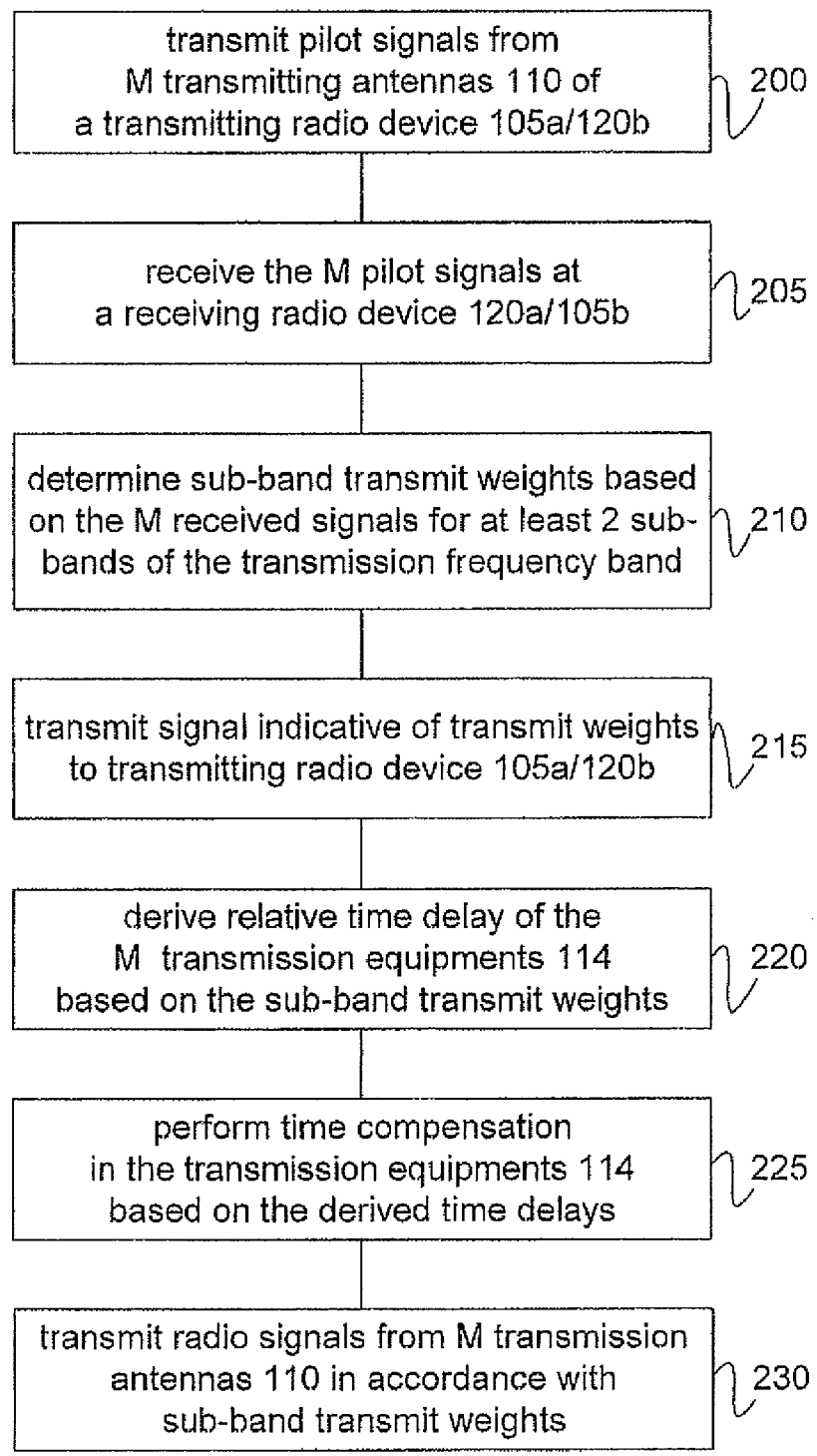
FIG. 2 is a flowchart schematically illustrating an embodiment of the inventive method.

A flowchart illustrating an embodiment of the inventive method is shown in FIG. 2. In step 200, pilot signals are transmitted from M transmitting antennas 110 of a transmitting radio device 105a/120b, where M≧2. In step 205, the transmitted pilot signals are received by a receiving radio device 120a/105b. In step 210, the frequency band of the pilot signals is divided into K sub-bands, where K≧2, and transmit weights are determined, based on the received pilot signals, for the K sub-bands for each of the M transmitting antennas 110. In step 215, a signal indicative of the K×M transmit weights is transmitted from the receiving radio device 120a/105b to the transmitting radio device 105a/120b. The transmitting radio device 105a/120b derives, in step 220, the relative time misalignment of the M transmitting antennas 110 based on the K×M transmit weights. In step 225, the respective transmission equipments 114 connected in relation to transmitting antennas 110 are calibrated in accordance with the derivation performed in step 220, in order to improve the time alignment of the transmission equipments 114. Step 230 can then be entered, in which the derived sub-band transmit weights are used in the transmission of radio signals from the M transmitting antennas, in order to compensate for the variations in transmission path between the signals transmitted by different transmit antennas 110. However, if the use of one transmit weight for the entire frequency band gives sufficiently good transmission quality, then step 230 can be omitted or adjusted accordingly.

A radio base station 105 normally serves a plurality of user equipments 120. Any time misalignment of the M transmission equipments 114 will effect the phase of signals transmitted to the user equipments 120 served by the radio base station 105. In order to improve the statistical certainty of the derivation, the derivation of the time misalignment of the M transmission equipments 114 (cf. step 220 of FIG. 2) of a radio base station 105 can advantageously be based on transmit weights obtained from a plurality of user equipments 120. Furthermore, the derivation of step 220 could advantageously be performed over a longer period of time, for example on the time scale of hours, since the time delay of the transmission equipment 114 normally does not vary significantly over shorter time scales. Similarly, a user equipment 120 is served by a plurality of radio base stations 105 over time. Hence, the derivation of the time misalignment of the M transmission equipments 114 (cf. step 220 of FIG. 2) of a user equipment 120 can advantageously be based on transmit weights obtained from a plurality of radio base stations 105.

The sampling of instantaneous values of the relative time delays according to steps 200-220 of FIG. 2 could for example be performed 10 times per second, or at any other rate. In one embodiment of the invention, a more or less continuous integration could be performed over time in order to obtain an average of the time misalignment. Alternatively, the time misalignment estimation of FIG. 2 could be performed at regular intervals or on demand, in order to detect any changes in the time delay caused by for example variations in temperature, or ageing of the transmission equipment 114.

Embodiments of the inventive method will now be described in more detail. If the number of transmitting antennas 110 is M, and the transmission frequency band is divided into K sub-bands of frequency span $\Delta f$, where each sub-band is numbered k where $k \in \{1, \ldots, K\}$ and k=1 represents the frequency band of lowest frequency, then the signal $y_k$ received at a receiving radio device 120a/105b, including the signals from the M transmitting antennas 110, can be assumed to follow the following expression for a given sub-band k:

$$y_k = H_k C_k x_k + e_k \quad (1),$$

where the transmission channel matrix $H_k$ is a representation of the transmission channel, $e_k$ represents interference and noise experienced on the transmission channel, $x_k$ is the signal transmitted from the transmitting radio device 105a/120b employing transmit diversity and $C_k$ is a diagonal matrix capturing the delays of the M different transmitting antennas 110:

$$C_k = \text{diag}\{e^{-j2\pi\Delta f k \tau_1} \ldots e^{-j2\pi\Delta f k \tau_M}\} \quad (2),$$

where $\tau_m$ is the time delay associated with the $m^{th}$ transmitting antenna 110. The value of the time delay $\tau_m$ of the $m^{th}$ transmission equipment 114 can be assumed to be the same in all k frequency sub-bands. $C_k$ will in the following be referred to as the time delay matrix for the sub-band k. In a mobile radio system 100 operating according to the LTE standard, a frequency span $\Delta f$ of the sub-band could for example be 180 kHz (corresponding to the smallest bandwidth that can be allocated to a user at any one time according to the LTE standard). Needless to say, $\Delta f$ could take other values.

In expression (1), $y_k$ is measured and $x_k$ represents the known transmitted pilot signal pattern so that the product of $H_k C_k$ can be estimated, where $H_k$ represents the transmission channel and $C_k$ represents the unknown time delays $\tau_1, \ldots \tau_M$ of the M transmission equipments 114.

When the transmission frequency band is divided into K different sub-bands, let $w_k$ be a sub-band transmit weight vector for sub-band k:

$$w_k = (w_k^1, \ldots w_k^M) \quad (3)$$

where the sub-band transmit weights $w_k^1, \ldots w_k^M$ represent the respective transmit weights that should be applied to the M different transmission equipments 114 within the sub-band k, in order to compensate for the differences in transmission path between the different radio links 130/135 of the M transmitting antennas 110 as well as for any time misalignment between the M different transmission equipments 114.

Let W represent a common transmission path transmit weight vector $$W = (W^1, \ldots, W^M) \quad (4)$$

where the transmission path transmit weights $W^1, \ldots, W^M$ represent the respective transmit weights that should be applied to the M different transmitting antennas 110 in order to compensate for the differences in transmission path (not including phase shifts caused by time misalignment of the different transmission equipments 114).

The respective transmission path transmit weights $W^m$ can be expressed as $$W^m = A^m \exp(j\phi^m) \quad (5),$$

where $A^m$ represents the relative amplitude difference between a received signal from a reference transmitting antenna 110 and that of the $m^{th}$ transmitting antenna 110 caused by the transmission path, and $\phi^m$ represents the relative phase shift that should be employed by the $m^{th}$ transmission equipments 114 in order to compensate for the differences in transmission path.

Similarly, the respective sub-band transmit weights $w_k^m$ can be expressed as $$w_k^m = B_k^m \exp(j\phi_k^m) \quad (6),$$

where $B^m$ represents the relative amplitude difference between a received signal from a reference transmitting antenna 110 and that of the $m^{th}$ transmitting antenna 110, and $\phi_k^m$ represents the relative phase shift of the signal received from the $m^{th}$ transmitting antenna 110 when taking into account both time misalignment of the transmission equipment 114 and phase shifts due to the transmission path. Hence, assuming that the phase shift caused by the transmission path is independent of frequency, the following relation between $\phi_k^m$ and $\phi^m$ is obtained:

$$\phi_k^m = \phi^m - 2\pi f \tau_m \quad (7).$$

Expression (7) does not always give an accurate instantaneous relation between the phase shifts $\phi^m$ and $\phi_k^m$. However, the expression provides an adequate relation between values of $\phi^m$ and $\phi_k^m$ obtained over a longer period of time.

An embodiment of the inventive method of determining the time delays $\tau_1, \ldots \tau_M$ of the M different transmission equipments 114 based on sub-band transmit weight vectors $w_k$ will now be described. A time delay $\tau$ of a transmission equipment 114 will cause, in a transmitted signal, a phase shift which varies linearly with frequency—the phase shift caused by the time delay $\tau$ will be larger for higher frequencies. The time delay $\tau$ of the signal can therefore be estimated by estimating the phase shift between neighbouring sub-bands for each transmitting antenna. Consider the following relations:

$$v_1 = PhaseDiff(w_2, w_1)/2\pi\Delta f \quad (8)$$
$$v_2 = PhaseDiff(w_3, w_2)/2\pi\Delta f$$
$$\vdots$$
$$v_{K-1} = PhaseDiff(w_K, w_{K-1})/2\pi\Delta f,$$

where the function PhaseDiff calculates the element-wise phase difference and $\Delta f$ is the difference in frequency between sub-bands k and k+1. As explained above, the $m^{th}$ element in a sub-band transmit weight vector $w_k$ is the transmit weight $w_k^m$ applicable to the $m^{th}$ transmission equipments 114 within sub-band k. As can be seen from expressions (6), (7) and (8), the $m^{th}$ element of each of the vectors $v_k$, (where $k \in [1, \ldots, K-1]$) is an estimate of the time delay $\tau_m$ of the $m^{th}$ transmission equipment 114:

$$v_k^m \approx \tau_m \quad (9),$$

Hence, an estimate of the time delays $\tau_1, \ldots \tau_M$, can be obtained from each of the vectors $v_k$, which vectors hereinafter will be referred to as time delay vectors $v_k$. Assuming that the transmission path transmit weight vector W does not vary between two neighbouring sub-bands, the difference in phase between any two neighbouring sub-bands k and k+1 will be the same for all $k \in [1, \ldots, K-1]$ if the frequency band is divided into K sub-bands of equal frequency span. As can be seen from relations (8) and (9), dividing the frequency band into only 2 sub-bands is sufficient in order to obtain an estimate of the M time delays $\tau_1, \ldots \tau_M$. However, an instantaneous frequency variation of the transmission path can always be expected. In order to improve the estimate of the time delays $\tau_1, \ldots \tau_M$, an average of the time delays obtained from K-1 time delay vectors $v_k$, where K>2, can advantageously be calculated. Moreover, by performing averaging over longer periods of time, and/or based on sub-band transmit weight vectors $w_k$ obtained from a plurality of receiving radio devices 120a/105b, the accuracy of the estimated time delays $\tau_1, \ldots \tau_M$, can be improved.

An alternative method of obtaining estimates of the time delays $\tau_1, \ldots \tau_M$, will now be described. Assuming that the transmission path transmit weight vector W is constant over the whole frequency band used by the transmitting radio device 105a/120b, the transmit weight vector $w_k$ for a sub-band k can be assumed to be determined by multiplying the time delay matrix $C_k$ for the sub-band k with the transmit weight vector W (cf. expressions (2), (5) and (6)):

$$w_k \approx C_k W \quad (10)$$

The assumption of expression (10) is more correct in the long-term case, where the correlation between transmitting antennas 110 is high and the shape of the beam does not vary significantly with time, since all sub-bands under mild conditions have the same long-term channel co-variance matrix $E\{H_k H_k^H\}$. The accuracy of expression (10) decreases as the correlation between transmitting antennas 110 decreases.

As can be seen in expression (2) above, the only unknown quantities in matrix $C_k$ are the M time delays, $\tau_1, \ldots \tau_M$, of the M different transmitting antennas 110. By determining K sub-band transmit weight vectors for K different sub-bands, $w_1, \ldots, w_K$, a set of equations is obtained from equation (10). By such a set of equations, the M time delays, $\tau_1, \ldots \tau_M$, can be determined:

$$w_1 \approx C_1 W \quad (11)$$
$$w_2 \approx C_2 W$$
$$\vdots$$
$$w_K \approx C_K W$$

Set of equations (11) comprises 3M unknowns: There are M unknown time delays $\tau_m$, and each of the M elements of W is a complex number having two unknowns (cf. expression 5). However, each $w_k$ similarly consists of M complex elements. Thus, assuming that the sub-band transmit weight vectors $w_k$ can be determined through measurements, the set of equations (11) can be solved if 2MK>3M, i.e. when K≧2. Hence, regardless of the number of transmitting antennas 110, the M relative time delays, $\tau_1, \ldots \tau_M$, of the M different transmitting antennas 110 can be determined by dividing the frequency band into 2 sub-bands.

The set of equations (11) could for example be solved in the least square sense, in the maximum likelihood sense, or in any other appropriate way.

The relation given by equations (11) between the sub-band transmit weight vectors, $w_1, \ldots, w_K$, and the transmission path transmit weight vector, W, is an example only, and other relations between the time delays $\tau_1, \ldots \tau_M$, the vectors $w_1, \ldots, w_K$, and the vector W can be used in order to derive the relative time delays $\tau_1, \ldots \tau_M$.

The embodiments of the inventive method by which the time misalignment of the different transmitting antennas 110 is determined by use of relations (10) or the set of equations (11) assume that the sub-band transmit weight vectors, $w_k$, can be determined. This can be done in different ways. For example, for a situation where long-term beam-forming and single stream beam-forming can be assumed, the sub-band transmit weight vector for sub-band k can be assumed to be determined for example as:

$$w_k = \arg_w \max(w^H R_k w) \quad (12),$$

where $R_k$ is the long term channel covariance matrix of the effective transmission channel matrix $H_k C_k$: for the sub-band k: $R_k = E\{C_k^H H_k^H H_k C_k\}$, w is an index vector with the same dimensions as $w_k$, $w^H$ is the Hermitian conjugate of w, $H_k^H$ is the Hermitian conjugate of $H_k$, and $C_k^H$ is the Hermitian conjugate of $C_k$. As shown in expression (1), a value of $R_k$ can be obtained from measurements of the received signal at the receiving radio device 120a/105b. Hence, a value of $w_k$ can be obtained by maximising the expression $w^H R_k w$ with respect to w. The maximization with respect to w can for example include applying one or several constraints on w, such as e.g. a constraint on the norm of w, or a constraint of w having to belong to a codebook of allowed possible transmit weights, as further described below.

An alternative manner of obtaining an estimate of $w_k$ will now be described. A short-term estimate of the sub-band transmit weight vectors $w_k$ can for example be obtained from the relation $$w_k^m = y_{k,m}^H x_{k,m} \quad (13)$$

where $x_{k,m}$ is the transmitted pilot signal from the $m^{th}$ transmitting antenna within sub-band k, and $y_{k,m}$ in is the received signal corresponding to $x_{k,m}$. Hence, the $k^{th}$ sub-band transmit weight vector $w_k$ is given by $w_k=[w_{k,1} \ldots w_{k,M}]^T$. Yet another alternative is to determine the sub-band transmit weight vectors for example as:

$$w_k = \underset{w}{\operatorname{argmax}}(w^H G_k^H G_k w), \quad (14)$$

where $G_k=H_k C_k$ is an estimate of the effective transmission channel for sub-band k.

If the pilot signals that are transmitted by the M different transmitting antennas 110 are orthogonal to each other, the determination of the sub-band transmit weight vectors $w_k$ is facilitated.

As shown above, the relative time delays of different transmission equipments 114 can be derived from estimates of at least two sub-band transmit weight vectors $w_k$, which can be obtained in accordance with any of the above described methods or in any other suitable way. The relative time delays $\tau_1, \ldots \tau_M$ can for example be obtained by applying the value of the sub-band transmit weight vectors $w_k$ to the set of equations (8) or (11). Once the relative time delays $\tau_1, \ldots \tau_M$, have been derived, calibration of the transmission equipments 114 in accordance with the derived time delays $\tau_1, \ldots \tau_M$, can advantageously be made. Such calibration can be performed in a conventional manner by use of appropriate hardware and/or software.

As can be seen in expression (1), the received signal in frequency band $y_k$ normally has a noise-and-interference component $e_k$, which in the above has been assumed to be negligible. If an estimate of $e_k$ can be obtained, the accuracy of the derived time delays can be improved if the measured value $y_k$ is corrected with respect to the noise-and-interference component, prior to performing any derivation of the time delays $\tau_1, \ldots \tau_M$, for example by subtraction or correction in the minimum mean square error sense.

As has been shown above, the relative time delays of M transmission equipments 114 can be derived by dividing the transmission frequency bands into 2 or more sub-bands. Although there will be less calculations required and less information transmitted across the radio links 135/130 when the number of sub-bands is small, there may be reasons for setting the number of sub-bands to a higher number than 2. For example, if the time misalignment of the different transmission equipments 114 of a transmitting radio device 105a/120b is large, the width of each sub-band could advantageously be narrow in order to accurately identify the time delays $\tau_1, \ldots \tau_M$. This may for example be the case when calibration of time delays has not been performed for a long time.

Moreover, if the frequency variation of any phase shift caused by the transmission path ($\phi^m$) is significant, an adequate compensation of such phase shift may require a greater frequency granularity of the transmit weight vector. Such compensation is for example illustrated in step 230 of FIG. 2. Different transmit weights $w_k^m$ can be used for the different sub-bands k transmitted by the same transmitting antenna 110. If desired, the relative phase shift $\phi_k^m$ of the transmit weight $w_k^m$ can be adjusted to the fact that calibration of the transmission equipment 114 has already been made in accordance with the $\tau_m$-related component of $\phi_k^m$. However, in the general case, the variation in the relative time delays $\tau_1, \ldots \tau_M$ of the different transmission equipments 114 is slow compared to the variation in the respective transmission paths. Hence, once the different transmission equipments 114 have been calibrated in accordance with relative time delays $\tau_1, \ldots \tau_M$, determined according to the invention, the contribution to $\phi_k^m$ from any time misalignment is generally small compared to the contribution from variations in the transmission path.

In an implementation of the invention, a code book, defining allowed values for the transmit weights, could be used. Such a code book can for example be used in order to reduce the bandwidth used for the transmission of the transmit weights from the receiving radio device 120a/105b to the transmitting radio device 105a/120b. Hence, the values of the sub-band transmit weights $w_1, \ldots, w_K$ as derived, for example by use of expression (12) or in any other way, may not be allowed, but the nearest allowed value may have to be used instead. It would be advantageous if an as good as possible estimation of $w_1, \ldots, w_K$ could be used in a derivation of the time delays $\tau_1, \ldots \tau_M$ performed for example by use set of relations (8) and (9) or (11), so that the derived values of $w_1, \ldots, w_K$ are transmitted to the transmitting radio device 105a/120b if the derivation of the relative time delays $\tau_1, \ldots \tau_M$ is to be performed in the transmitting radio device 105a/120b, or, alternatively, that the derivation of the relative time delays $\tau_1, \ldots \tau_M$ is performed in the receiving radio device 120a/105b and the resulting values of the time delays $\tau_1, \ldots \tau_M$ are transmitted to the transmitting radio device 105a/120b. However, in some implementations of the invention, neither of these scenarios will be feasible, and instead, one or more code book values representing the derived values of $w_1, \ldots, w_K$ will be transmitted over a radio link 135/130 to the transmitting radio device 105, where the derivation of the relative time delays $\tau_1, \ldots \tau_M$ will take place. In such implementations, it would be advantageous to perform an integration over a longer period of time, in order to compensate for the inaccuracy in each individual set of sub-band transmit weight vectors, so that values of $\tau_1, \ldots \tau_M$ of good accuracy can still be obtained. Moreover, sub-band transmit weight data from a plurality of receiving radio devices 120a/105b receiving signals from the same transmitting radio device 105a/120b may also (or alternatively) be used in the derivation of average values of the relative time delays.

In an implementation of the invention wherein a code book is used, the manner in which the sets of equations (8), (11) or other suitable expression is solved can advantageously take the code-book into consideration in order to find a better solution.

The relative time delays of the different transmission equipments 114 normally do not vary noticeably over a short period of time, and are most often the same for different radio links 130/135 established between a particular transmitting radio device 105a/120b and different receiving radio devices 120a/105b. As mentioned above, measurements performed by different receiving radio devices 120a/105b could be used in the derivation of the time delays $\tau_1, \ldots \tau_M$, in order to improve the estimate of the time delays, and/or a plurality of measurements taken over a longer period of time can be used in order to improve the accuracy of the estimated relative time delays. As an alternative, or complement, to averaging over time or over several receiving radio devices 120a/105b, the set of equations (8), (11) or any other suitable expression can be jointly solved with transmit weight vectors $W_k$ obtained at more than one time instance and/or from more than one receiving radio device 120a/105b.

Regardless of how many user equipments 120 were part of the collection of data used for obtaining an estimate of the relative time delays $\tau_1, \ldots \tau_M$, between different transmission equipments 114 of a radio base station 105, the derived time delays $\tau_1, \ldots \tau_M$ can advantageously be used to calibrate the transmission equipment 114 in a general sense, so that the time delay compensation provided by $\tau_m$ is performed on all radio links 130 over which the $m^{th}$ transmitting antenna 110 is transmitting, regardless of which user equipment 120 is the intended receiver.

Figure 3A:
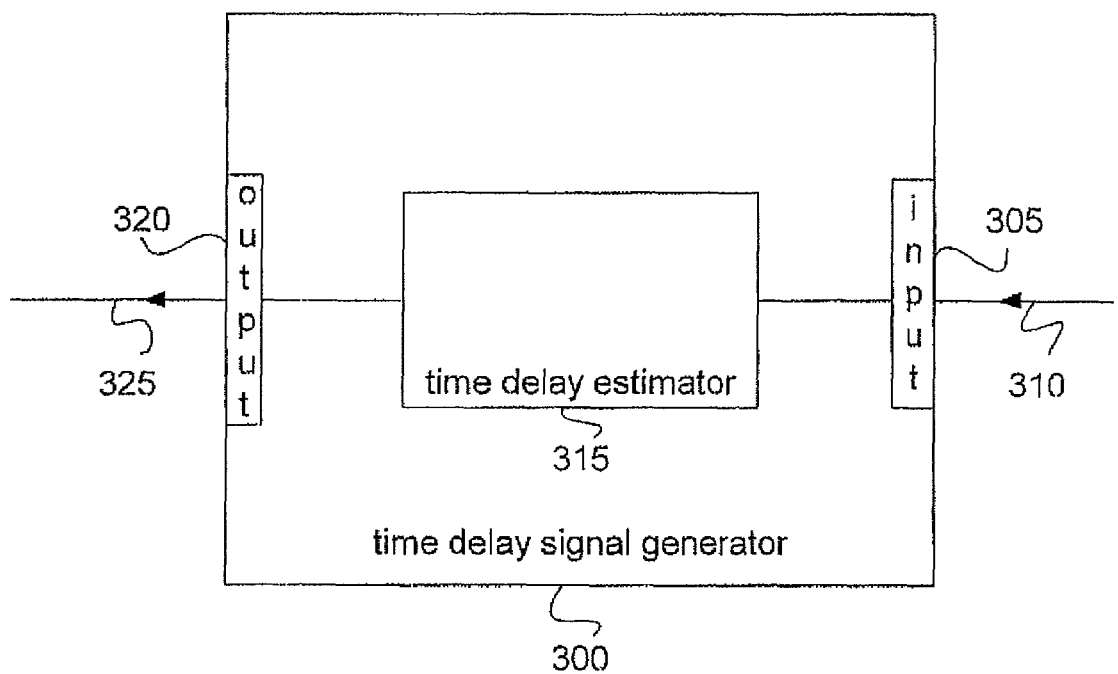
FIG. 3a is a schematic illustration of a time delay signal generator according to an embodiment of the invention.

A time delay signal generator 300 according to an embodiment of the invention is schematically illustrated in FIG. 3a. The time delay signal generator of FIG. 3a includes an input 305 adapted to receive a signal 310 indicative of sub-band transmit weight vectors $w_1, \ldots w_K$. Signal 310 could for example comprise K signals, each signal indicative of a transmit weight vector $w_k$ applicable to a sub-band k. Time delay signal generator 300 further includes time delay estimator 315 adapted to derive the relative time delays $\tau_1, \ldots \tau_M$, for example by use of the set of equations (8) or (11). Time delay estimator 315 comprises suitable hardware and/or software for deriving an estimate of the relative time delays $\tau_1, \ldots \tau_M$, and for generating a signal indicative of the derived time delays $\tau_1, \ldots \tau_M$. Furthermore, time delay signal generator 300 could comprise suitable hardware and/or software for deriving an average value of the time delays based on a plurality of sub-band transmit weight vectors obtained over a longer period of time and/or obtained from a plurality of receiving radio devices 120a/105b. Time delay signal generator 300 advantageously includes memory means for storing the suitable software. Time delay estimator 315 is connected to an output 320 for outputting a signal 325 indicative of the time delays $\tau_1, \ldots \tau_M$. In one embodiment of time delay signal generator 300, the time delay estimator 315 is adapted to generate M different output signals 320, each output signal indicative of a time delay $\tau_m$ applicable to the $m^{th}$ transmitting antenna 110. The time delay signal generator 300 could be implemented in the transmitting radio device 105a/120b, or in the receiving radio device 120a/105b.

Figure 3B:
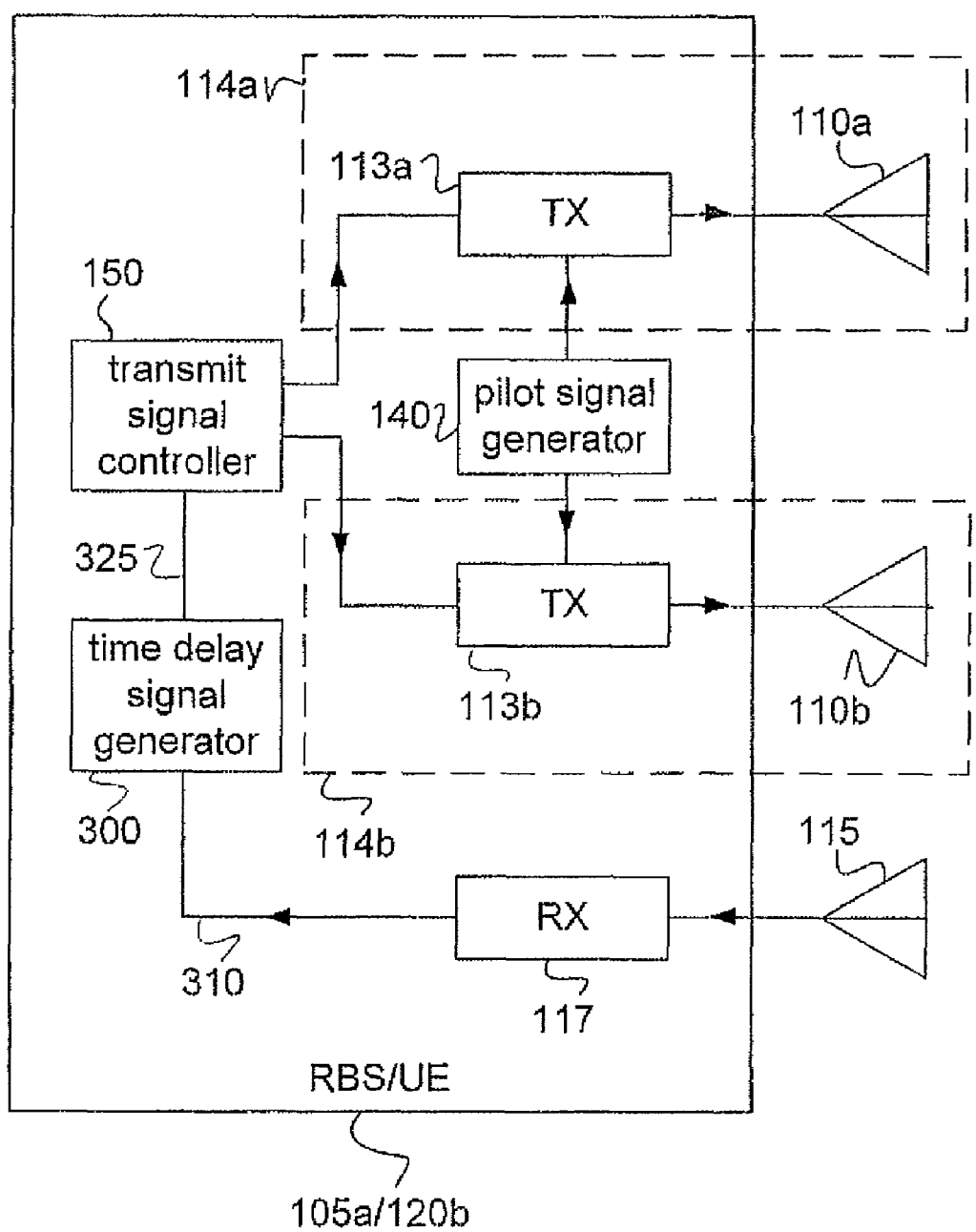
FIG. 3b illustrates a transmitting radio device including a time delay signal generator according to an embodiment of the invention.

FIG. 3b illustrates a transmitting radio device 105a/120b including a time delay signal generator 300 according to an embodiment of the invention. In FIG. 3b, time delay signal generator 300 is connected to receive the signal 310 indicative of sub-band transmit vectors $w_1, \ldots, w_K$ from the receiver 117 of the transmitting radio device 105a/120b, and further connected to deliver the signal 325 indicative of the derived time delays $\tau_1, \ldots \tau_M$ to the transmit signal controller 150. Alternatively, the transmit signal controller 150 and the time delay signal generator 300 could be implemented as the same entity. The input signal 310 could be received from a receiving radio device 120, as illustrated in FIG. 3b, or could be derived in the transmitting radio device 105a/120b based on a signal received from the receiving radio device 120a/105b, the signal being indicative of the measured received pilot signals.

Figure 3C:
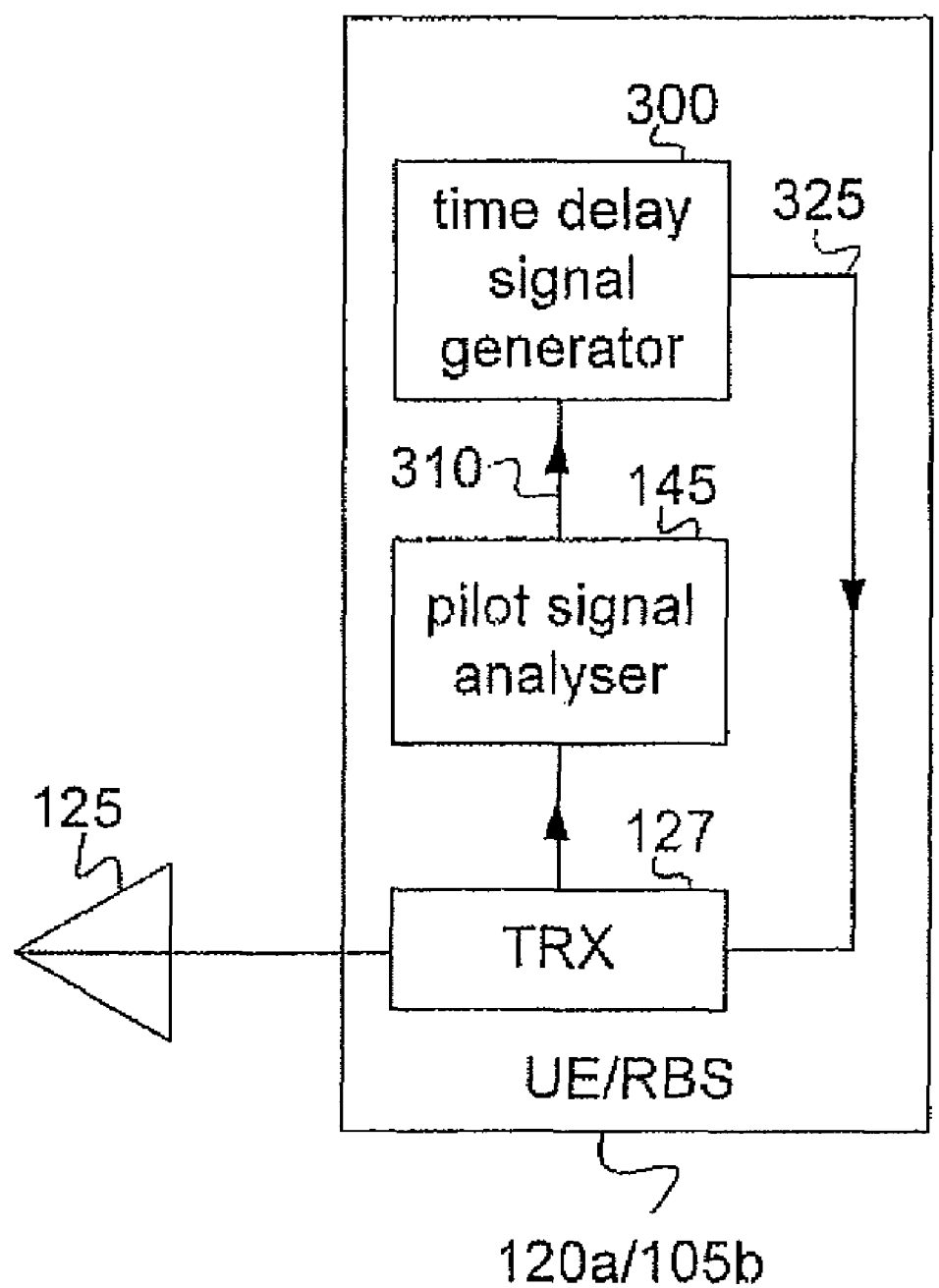
FIG. 3c illustrates a receiving radio device including a time delay signal generator according to an embodiment of the invention.

FIG. 3c illustrates receiving radio device 120a/105b including a time delay signal generator 300. Time delay signal generator 300 of FIG. 3c is connected to receive a signal 310 indicative of sub-band transmit vectors $w_1, \ldots, w_K$ from the pilot signal analyser 145. The time delay signal generator 300 is further connected to deliver an output signal 325 indicative of the time delays $\tau_1, \ldots \tau_M$ to the transceiver 127, to be transmitted over uplink 135 to a transmitting radio device 105a/120b.

As discussed above, the invention can advantageously be applied to a transmitting radio device 105a/120b having more than one transmitting antenna 110 which are used to transmit the same data to a receiving radio device 120a/105b. This applies both to transmit diversity arrangements where the transmitting antennas 110 are separated by a large distance (several wavelengths) and the transmitting antennas are uncorrelated; in an uncorrelated arrangements where transmit diversity is obtained by orthogonal polarisation; and in beam-forming arrangements where the different transmitting antennas 110 are separated by a smaller distance (e.g. half a wavelength) and the antennas are correlated. The invention can also be applied in arrangements which combine uncorrelated and correlated antennas: For example, consider the situation where two (or more) transmitting antennas 110 are used to obtain beam-forming, and a similar set of two (or more) beam-forming transmitting antennas 110 are used to obtain transmit diversity. A relative time-delay $\tau$ can, by means of the invention, be obtained for all four (or more) transmission antennas 110 of this arrangement.

The invention can also be applied to transmitting radio devices 105a/120b having more than one transmitting antennas 110 which are used to transmit different data to a receiving radio device 120a/105b, in a so called MIMO (Multiple Input Multiple Output) configuration.

Since the invention can advantageously be implemented by use of software, the invention provides a cost-effective way of improving the time alignment of transmission equipments 114 of a radio base station 105 or user equipment 120 employing transmit diversity.

One skilled in the art will appreciate that the present invention is not limited to the embodiments disclosed in the accompanying drawings and the foregoing detailed description, which are presented for purposes of illustration only, but it can be implemented in a number of different ways.

The invention claimed is:

1. A method of improving the performance of a mobile radio system comprising at least node having at least two transmission equipments adapted to transmit radio signals within a frequency band, the method comprising:

receiving, in the node from another node in the mobile radio system, a signal indicative of at least two sub-band transmit weight vectors, wherein a sub-band transmit weight vector comprises weight vectors applicable to the at least two transmission equipments, respectively, in a sub-band of the frequency band; and deriving a relative time delay between the at least two transmission equipments based on the at least two sub-band transmit weight vectors, for compensating a time misalignment of the at least two transmission equipments.

2. The method of claim 1, wherein the node is a radio base station and the other node is a user equipment, and wherein receiving the signal indicative of the at least two sub-band transmit weight vectors comprises the radio base station receiving the signal from the user equipment.

3. The method of claim 1, wherein the node is a user equipment and the other node is a radio base station, and wherein receiving the signal indicative of the at least two sub-band transmit weight vectors comprises the user equipment receiving the signal from the radio base station.

4. The method of claim 1, wherein the step of deriving comprises solving a set of equations expressing a relation between the sub-band weight vectors and a transmission path weight vector, the transmission path weight vector comprising transmit weights indicative of transmit weights for compensation of time delay in a received signal caused by a transmission path.

5. The method of claim 4, wherein the set of equations corresponds to the following set of equations:

$$w_1 \approx C_1 W$$
$$\vdots$$
$$w_k \approx C_k W,$$

in $w_1, \ldots, w_k$ are the sub-band transmit weight vectors, W is the transmission path weight vector, and $C_1, \ldots, C_k$, are time delay matrices respectively applicable to the respective sub-bands, each time delay matrix having elements reflecting the relative time delay of each of the transmission equipments.

6. The method of claim 1, wherein the step of deriving comprises performing an element-wise operation of at least two of the sub-band transmit weight vectors.

7. The method of claim 6, wherein the element-wise operation is element-wise phase difference.

8. The method of claim 1, wherein the signal indicative of the at least two sub-band transmit weight vectors has been obtained by measuring pilot signals transmitted by the at least two transmission equipments, wherein the pilot signals transmitted by the different transmission equipments are orthogonal to each other.

9. The method of claim 1, wherein the signal indicative of the at least two sub-band transmit weight vectors has been obtained by measuring pilot signals transmitted by the at least two transmission equipments over respective radio transmission channels, wherein the sub-band transmit weight vectors have been derived from the following relation:

$$w_k = \arg_w \max(w^H R_k w),$$

wherein $w_k$ is a sub-band transmit vector for a particular sub-band, w is an index vector with the same dimensions as $w_k$, $R_k = E\{C_k^H H_k^H H_k C_k\}$ is the covariance matrix of the total transmission channel, $C_k$ is a time delay matrix applicable to the particular sub-band having elements reflecting the relative time delay of each of the transmission equipments, and $H_k$ is a representation of the radio transmission channel.

10. The method of claim 1, wherein the step of deriving is performed a plurality of times so that a plurality of relative time delay values are generated for the at least two transmission equipments, further comprising averaging the plurality of relative time delay values in order to improve the accuracy of the derived relative time delay.

11. A computer program product for improving the performance of a mobile radio system, the mobile radio system comprising at least one node having at least two transmission equipments adapted to transmit radio signals within a frequency band, the computer program product stored in a non-transitory computer-readable medium within the node and comprising computer program code operable to, when run by the node:

receive, from another node in the mobile radio system, a signal indicative of at least two sub-band transmit weight vectors, wherein a sub-band transmit weight vector comprises weight vectors applicable to the at least two transmission equipments, respectively, in a sub-band of the frequency band; and derive a relative time delay between the at least two transmission equipments based on the at least two sub-band transmit weight vectors, for compensating a time misalignment of the at least two transmission equipments.

12. The computer program product of claim 11, wherein the node comprises a radio base station in the mobile radio system, and the other node comprises a user equipment in the mobile radio system.

13. The computer program product of claim 11, wherein the node comprises a user equipment in the mobile radio system, and the other node comprises a radio base station in the mobile radio system.

14. The computer program product of claim 11, wherein the computer program code operable to derive a relative time delay comprises computer program code operable to solve a set of equation expressing a relation between the sub-band transmit weight vectors and a transmission path weight vector, the transmission path weight vector comprising transmit weights indicative of transmit weights for compensation of a time delay in a received signal caused by a transmission path.

15. The computer program product of claim 11, wherein the computer program code operable to derive a relative time delay comprises computer program code operable to perform an element-wise operation of two of the sub-band transmit weight vectors.

16. The computer program product of claim 15, wherein the computer program code operable to derive a relative time delay is operable to:

perform the derivation of a time delay a plurality of times so that a plurality of relative time delay values are generated for the at least two transmission equipments, and to average the plurality of relative time delay values in order to improve the accuracy of the derived relative time delays.

17. The computer program product of claim 11, wherein the computer-readable medium comprises a memory.

18. A time delay signal generator for use in a node in a mobile radio system, said node having at least two transmission equipments adapted to transmit radio signals within a frequency band, the time delay signal generator comprising:

an input configured to receive a signal from another node in the mobile radio system that is indicative of at least two sub-band transmit weight vectors, wherein a sub-band transmit weight vector comprises weight vectors applicable to the at least two transmission equipments, respectively, in a sub-band of the frequency band; and a time delay signal generator configured to derive a relative time delay between the at least two transmission equipments based on the at least two sub-band transmit weight vectors and to generate a signal indicative of the derived relative time delay; and an output configured to output the signal indicative of the derived time delay.

19. The time delay signal generator of claim 18, wherein the node comprises a radio base station that includes the time delay signal generator, and wherein the radio base station is configured to compensate for time misalignment between the at least two transmission equipments according to the derived relative time delay.

20. The time delay signal generator of claim 18, wherein the node comprises a user equipment that includes the time delay signal generator, and wherein the user equipment is configured to compensate for time misalignment between the at least two transmission equipments according to the derived relative time delay.

* * * * *